(12) United States Patent
Erden et al.

(10) Patent No.: US 7,643,235 B2
(45) Date of Patent: Jan. 5, 2010

(54) SYNCHRONIZATION FOR DATA COMMUNICATION

(75) Inventors: Mehmet Fatih Erden, Pittsburgh, PA (US); Erozan Mehmet Kurtas, Pittsburgh, PA (US); Mark Edward Re, Pittsburgh, PA (US)

(73) Assignee: Seagate Technology LLC, Scotts Valley, CA (US)

( * ) Notice: Subject to any disclaimer, the term of this patent is extended or adjusted under 35 U.S.C. 154(b) by 512 days.

(21) Appl. No.: 11/536,310

(22) Filed: Sep. 28, 2006

(65) Prior Publication Data

US 2008/0080082 A1    Apr. 3, 2008

(51) Int. Cl.
G11B 5/09    (2006.01)
(52) U.S. Cl. ...................... 360/51; 360/77.08
(58) Field of Classification Search ........................ None
See application file for complete search history.

(56) References Cited

U.S. PATENT DOCUMENTS

| 5,726,818 | A | 3/1998 | Reed et al. |
| 5,838,738 | A | 11/1998 | Zook |
| 5,917,668 | A | 6/1999 | Behrens et al. |
| 6,262,857 | B1 | 7/2001 | Hull et al. |
| 6,515,812 | B1 | 2/2003 | Bergmans et al. |
| 6,643,820 | B2 | 11/2003 | Tomita |
| 6,738,207 | B1 * | 5/2004 | Belser et al. .................. 360/31 |
| 7,054,088 | B2 * | 5/2006 | Yamazaki et al. ............. 360/65 |
| 7,064,914 | B1 | 6/2006 | Erden et al. |
| 7,236,324 | B2 * | 6/2007 | Albrecht et al. ............... 360/75 |
| 7,265,937 | B1 * | 9/2007 | Erden et al. ............. 360/78.14 |
| 7,349,167 | B2 * | 3/2008 | Erden et al. ................... 360/29 |
| 2003/0147166 | A1 * | 8/2003 | Hetzler et al. ................. 360/51 |
| 2006/0087758 | A1 * | 4/2006 | Imada et al. .................. 360/48 |

FOREIGN PATENT DOCUMENTS

JP    11224422 A * 8/1999

OTHER PUBLICATIONS

P. Chaichanavong, B. Marcus, J. Campello de Souza, R. New and B. Wilson, "Kalman Filtering applied to Timing Recovery in Tracking Mode", Dept. of Electrical Engineering, Stanford University, Stanford, CA, 2002.

* cited by examiner

*Primary Examiner*—Jason C Olson
(74) *Attorney, Agent, or Firm*—Westman, Champlin & Kelly, P.A.

(57) ABSTRACT

Timing recovery and synchronization for data communication is utilized. A pilot sequence of signals can be selected to improve recovery of a phase offset and a frequency offset in a communication system. Sampling instances can further be adjusted based on pilot sequences within a user data portion.

15 Claims, 12 Drawing Sheets

SYNCHRONIZATION FOR DATA COMMUNICATION

FIELD OF THE INVENTION

The present invention relates generally to systems employing communication channels. In particular, the present invention pertains to timing recovery and synchronization for data communication.

BACKGROUND OF THE INVENTION

Timing recovery is utilized in many different communication systems. Samples of signals within the communication systems are taken to perform timing recovery. Sampling instances are instances of time at which signals are taken. The sampling instances can deviate from the actual data (i.e., the source of the signal) as a function of the amount of phase offset in the system. Additionally, the sampling instances can deviate as a function of the amount of frequency offset. The amount of deviation can accumulate at every other sample if there is any frequency offset in the system. The deviation of the actual samples from the desired samples can cause a drop in system performance, or even result in system collapse or failure. The recovery of phase and frequency offset information becomes even more important in a noisy environment. Thus, it is important that phase and frequency offsets are recovered and sampling instances adjusted accordingly so that a signal processor samples the noisy analog signal close to the desired sampling instances.

One example communication system that utilizes timing recovery is a magnetic recording system. In a magnetic recording system, distortions in the system can result in changes in sampling offset. One of these distortions is spindle speed variation. Other distortions can also cause timing errors in the system. Among these distortions, some will translate into phase jitter in the system, some will be the source of frequency offset, and some will result into sudden phase offsets. In order to recover the desired sampling instances, timing recovery is implemented for processing both the servo sectors and the data sectors. Servo sectors generally contain disc and track information written during manufacture that is utilized by the disc drive to determine the location of tracks and sectors on the disc. In contrast, data sectors generally are utilized to store and retrieve user data. Thus, timing recovery performance affects both servo performance (i.e., the operation of the servo to position the read/write head) and the performance of the data processing.

SUMMARY OF THE INVENTION

The present invention relates to timing recovery and synchronization for data communication. In one aspect, a method of processing data in a communication system is provided. The method includes accessing a sequence of signals from a channel associated with the communication system and obtaining samples from the sequence of signals and samples between the sequence of signals. A phase offset and a frequency offset are calculated using the samples from the sequence of signals and the samples between the sequence of signals.

Another aspect relates to a method of processing data from a data storage medium. The method includes accessing a data sector having a plurality of timing recovery portions and a plurality of data portions. A first timing recovery portion of a data sector is processed to calculate a first phase offset and a first frequency offset. A first data portion is processed based on the first phase offset and the first frequency offset. Furthermore, a second timing recovery field is processed to calculate a second phase offset and a second frequency offset based on the first phase and the first frequency offset. A second data portion is processed based on the first phase offset the first frequency offset, the second phase offset and the second frequency offset.

In another aspect a data storage system includes a storage medium and a plurality of servo sectors on the storage medium. Each servo sector includes a timing recovery portion. A plurality of data sectors is also provided on the storage medium. Each data sector includes alternating timing recovery and data portions. A channel is configured to write data to and read data from the storage medium. The channel is further configured to process the timing recovery portions to calculate a phase offset and frequency offset and process the data portions based on the phase offset and the frequency offset.

DETAILED DESCRIPTION OF ILLUSTRATIVE EMBODIMENTS

Figure 1:
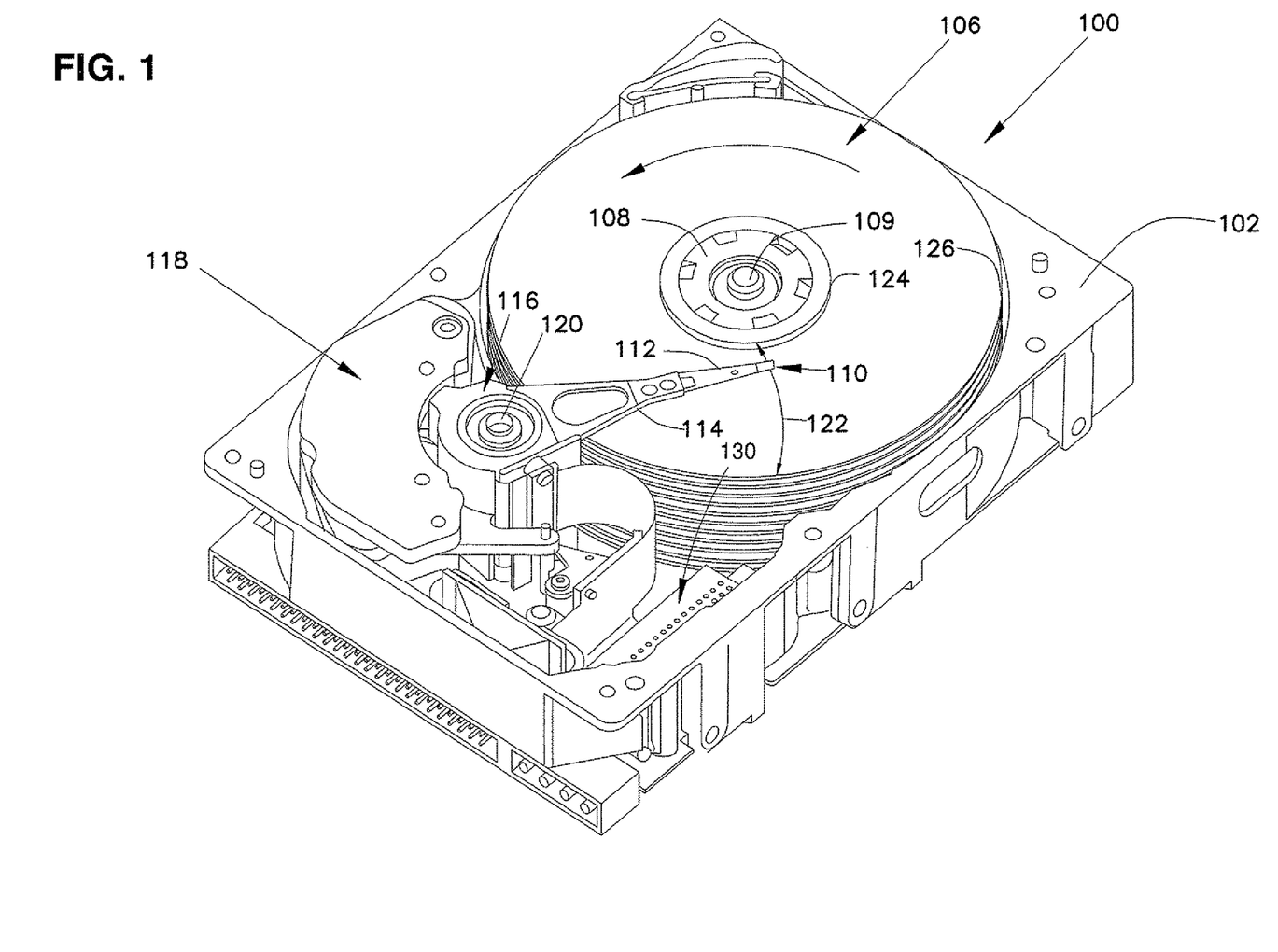
FIG. 1 is an isometric view of a disc drive.

FIG. 1 is an isometric view of a disc drive 100 in which embodiments of the present invention are useful. Disc drive 100 includes a housing with a base 102 and a top cover (not shown). Disc drive 100 further includes a disc pack 106, which is mounted on a spindle motor (not shown) by a disc clamp 108. Disc pack 106 includes a plurality of individual discs, which are mounted for co-rotation about central axis 109. Disc pack 106 can also include only a signal disc. Each disc surface has an associated disc head slider 110 which is mounted to disc drive 100 for communication with the disc surface. In the example shown in FIG. 1, sliders 110 are supported by suspensions 112 which are in turn attached to track accessing arms 114 of an actuator 116. The actuator shown in FIG. 1 is of the type known as a rotary moving coil actuator and includes a voice coil motor (VCM), shown generally at 118. Voice coil motor 118 rotates actuator 116 with its attached heads 110 about a pivot shaft 120 to position heads 110 over a desired data track along an arcuate path 122 between a disc inner diameter 124 and a disc outer diameter 126. Voice coil motor 118 is driven by servo electronics 130 based on signals generated by heads 110 and a host computer (not shown).

In many communications systems, including data storage channels (e.g., disc drives), transmitted data includes signals with a particular frequency and phase. In some situations, the exact transmission frequency is unknown. In the context of digital disc media, data is stored utilizing a clock having a particular frequency and phase. When the data is read from the disc media, an analog signal is obtained. In general, the peaks (or valleys) of the analog signal correspond to the digital bits on the disc media. From the analog signal, samples (i.e., a set of digital values) are obtained from sampling instances. In one example, a sampling clock comprises a continuous clock pulse having an associated frequency and phase. Sampling instances can correspond to the rising edges or, alternatively, the falling edges of the clock pulses. The sampling instances are the instances of time at which the samples of the data signal are taken. Further, the analog signal can be sampled close to the signal peaks to encourage an enhanced signal-to-noise ratio or a lower interference. However, if the frequency and phase associated with the sampling clock differs from that at which the data was written, the sampling instances may not correspond with the peaks of the analog signal and errors or loss of data can result. The signal-to-noise ratio may decrease or portions of the data may be missed completely. To compensate for the differences between the frequency and phase at which data is written and read, timing recovery can be utilized. In one example, a method of timing recovery synchronizes the sampling instances such that the frequency and phase at which the data is read corresponds to the phase and frequency at which it was written. In another example, the sampling instances can be taken close to the peaks of the analog signal to enhance the quality of the samples (e.g., improve signal-to-noise ratio, reduce interference). Further, in the context of writing to patterned media, the timing instances are adjusted such that data is written to defined bit islands.

Figure 2:
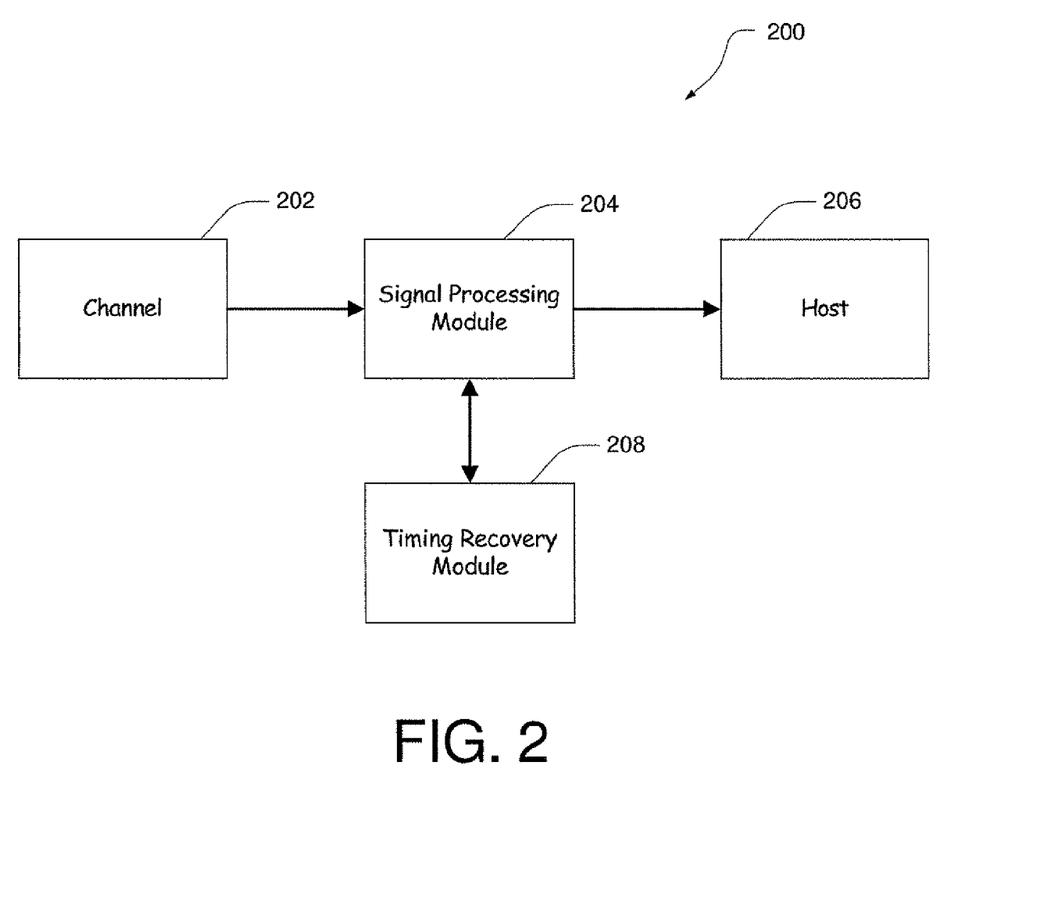
FIG. 2 is a block diagram illustrating a communication system utilizing timing recovery.

FIG. 2 is a block diagram illustrating a communication system 200 utilizing timing recovery. For example, communication system 200 can include disc drive 100 described in relation to FIG. 1. Channel 202 provides a signal to signal processing module 204. In one embodiment channel 202 is configured to supply a signal based on a transducer that obtains signals from a storage medium. In this case, channel 202 can include a read/write head that supplies a signal based on a magnetic field from a magnetic disc. In other embodiments, channel 202 can be a telecommunications or a wireless communication channel. However, it is important to note that channel 202 can be any means for supplying a signal to signal processing module 204.

Signal processing module 204 processes the signal received from channel 202. In one embodiment, signal processing module 204 comprises an A/D converter and supplies a digital output to host 206 based on an analog signal input from channel 202. In another embodiment, a sampling clock is provided to produce sampling instances of the analog signal provided from channel 202. In this manner, the sampling clock frequency produces a number of samples per a period of time.

An output of signal processing module 204 is supplied to a host 206. Host 206 can be any device configured to process and/or transmit the received signal. Examples of host 206 include, but are not limited to, a computer system or a server network.

As mentioned above, the sampling instances, as determined and acquired by signal processing module 204, can deviate in phase and/or frequency from the desired instances. Frequency and phase offsets can result in effects in communication system 200 that are not desired. To illustrate, many data signals to be sampled from channel 202 have peaks that typically are in the center of the data period. Sampling the data near this peak can encourage an enhanced signal-to-noise-ratio and lower interference.

Timing recovery module 208 is utilized in conjunction with signal processing module 204 to determine the desired sampling instances. In one embodiment, timing recovery module 208 operates to determine frequency and phase offsets between the desired sampling instances and the actual sampling instances. In one example, timing recovery module 208 comprises a phase-lock loop (PLL) circuit. The PLL circuit controls an oscillator to maintain a generated signal at a constant phase angle relative to a reference signal. In the context of data channels such as disk drives, data streams can be transmitted without an accompanying clock. A receiver (e.g., signal processing module 204) generates a clock from an approximate frequency reference. A PLL can be utilized to align the phase of the clock with the data stream. In one example, the PLL circuit utilizes transitions in the data stream to determine differences between the phase and frequency of the samples acquired by signal processing module 204 and the phase and frequency contained in the data stream acquired from channel 202 (e.g., the desired sampling instances).

The timing offset information obtained from timing recovery module 208 can be utilized to improve the operation of system 200. In one embodiment, a sampling frequency is adjusted such that the sampling instances occur at a rate substantially similar to the frequency present in the data signal. In another embodiment, a sampling phase is adjusted such that the sampling instances occur close to the peaks of the data signal.

Figure 3:
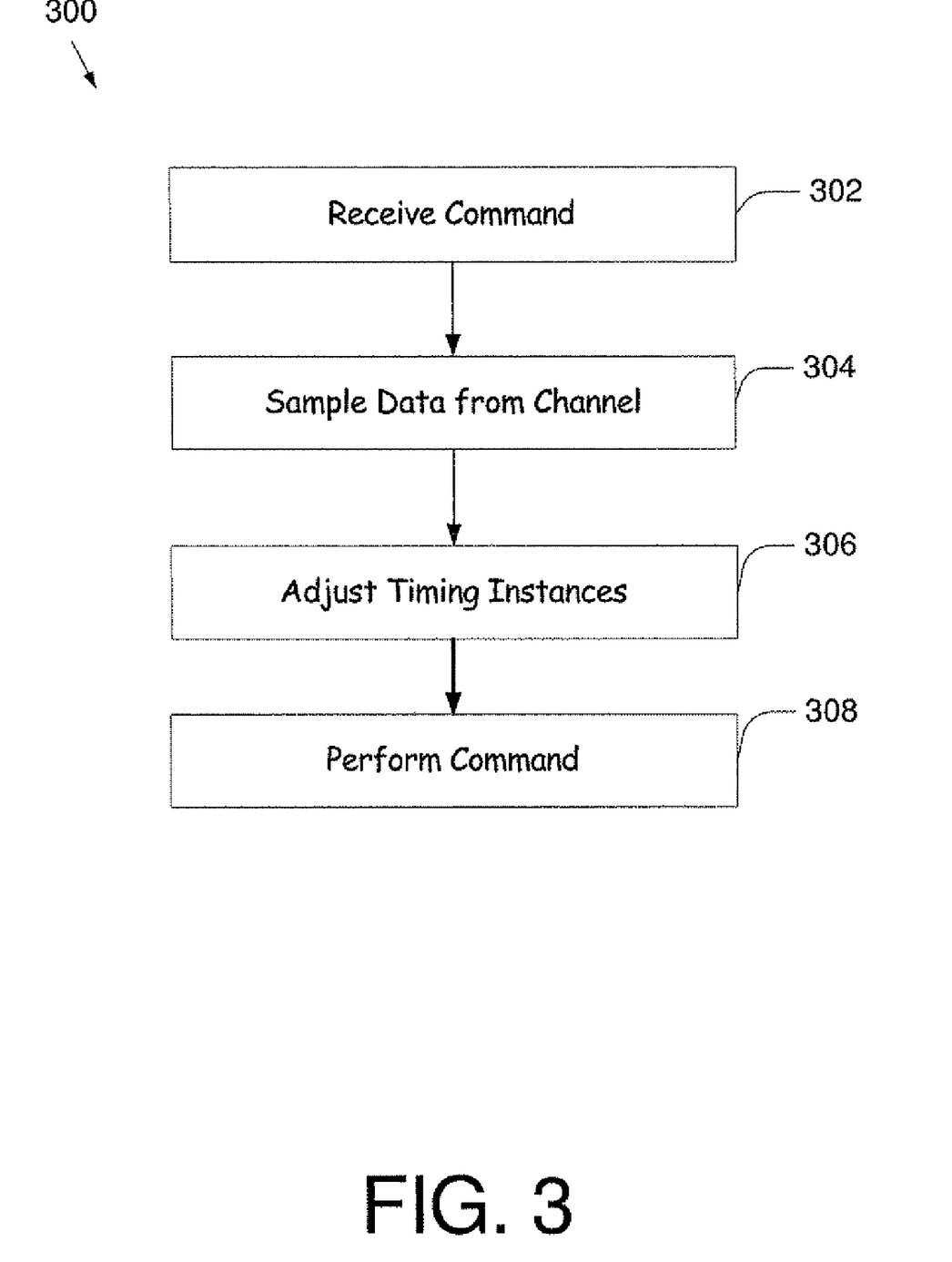
FIG. 3 is a flow chart illustrating a system of adjusting timing instances.

FIG. 3 is a flow chart utilizing synchronization of data from a channel in the context of a communication system. Synchronization method 300 begins with a command (step 302). In one example, command 302 is an instruction to begin a read or write process on a media storage system. Data from the channel is sampled at step 304 using initial timing instances. The initial timing instances are based on, for example, on an initial phase and frequency. In one embodiment, the data sampled with the initial timing instances corresponds to a portion of the channel comprising timing recovery information. In one embodiment, phase and frequency offsets between the sample data and the desired signal are determined. After the data is sampled, timing instances are adjusted (step 306) based on the sample data and the adjusted timing instances are utilized to perform the command (step 308).

Figure 4:
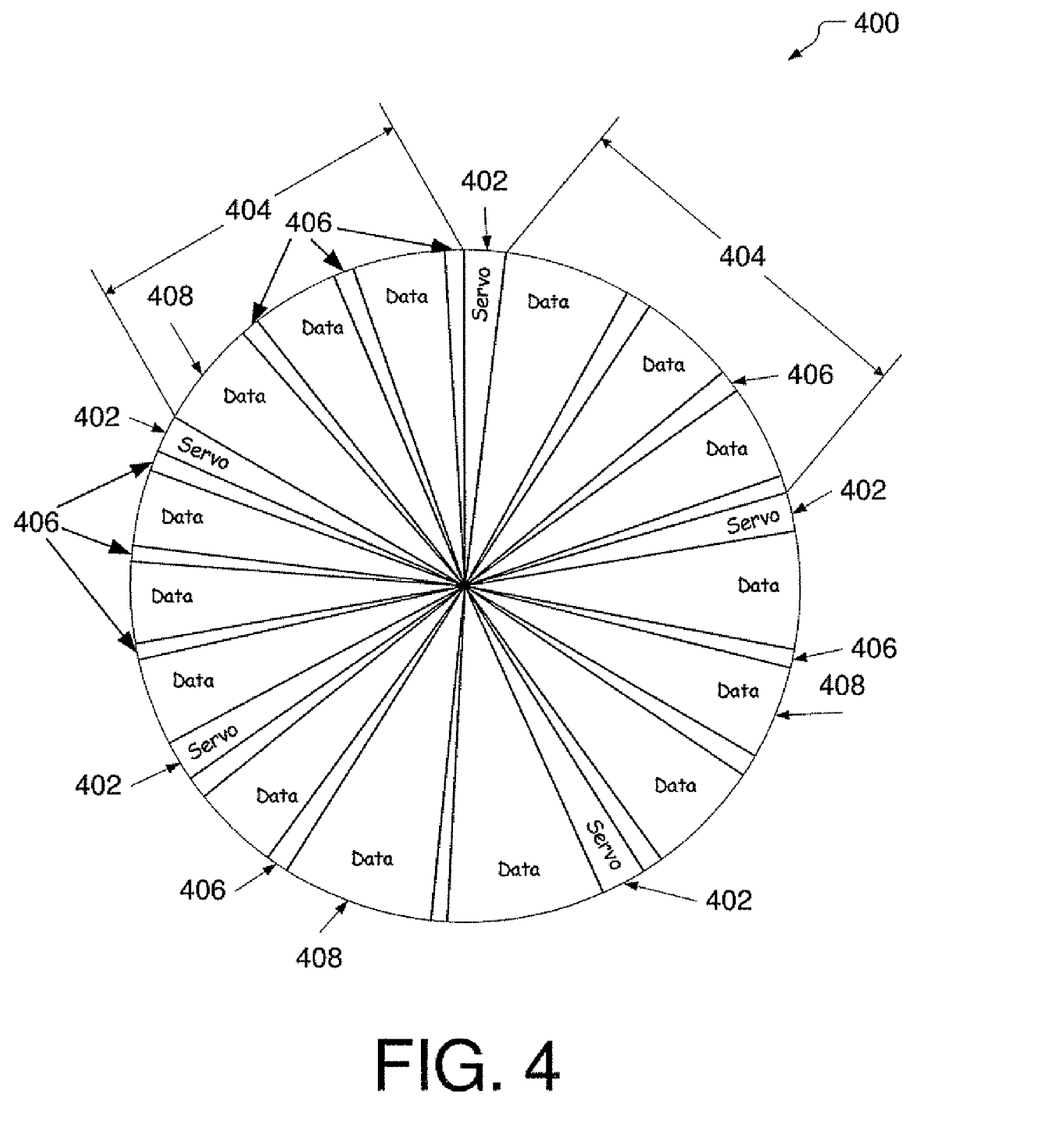
FIG. 4 is a cross-sectional view of a disc media layout.
Figure 4A:
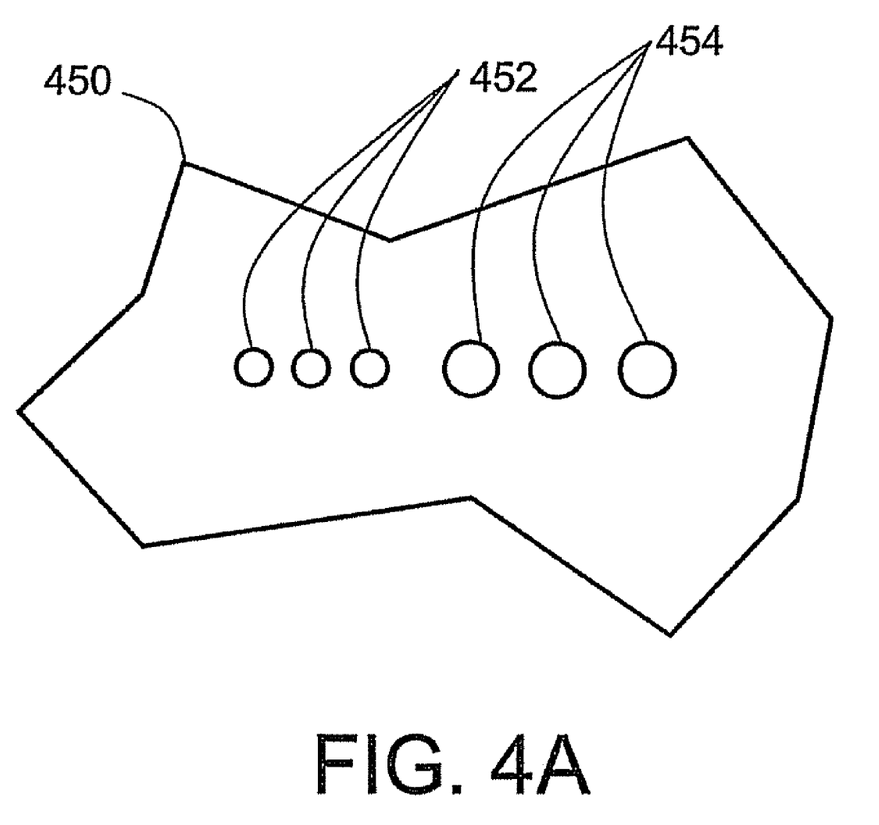
FIG. 4A illustrates a medium with a plurality of bit islands having a first size and a plurality of bit islands having a second size different than the first size.

In order to enhance timing recovery in a data storage system, several fields containing timing recovery information can be included on a storage medium. These fields can serve as a pilot sequence of signals for use in a timing recovery process. The sequence can be used to adjust sampling instances and correct timing errors such as phase and frequency offsets. FIG. 4 is an illustrative diagram of a disc 400 configured with embedded fields for timing recovery. Disc 400 comprises a number of servo sectors 402 and data sectors 404. Servo sectors 402 contain special patterns that can be utilized by the disc drive to determine the location of tracks and sectors on the disc. In one example, disc 400 can be a patterned medium comprising an array of discrete nanostructures. The patterned medium can include a plurality of uniform bit islands and trenches, each of the bit islands capable of storing one bit of data. As illustrated in an example in FIG. 4A, patterned medium 450 can include a first plurality of bit islands 452, having a first size and a second plurality of bit islands 454 having a second size that is different from the first size. The position at which the read/write head is located is important as the data must be written and read from the defined bit islands. As illustrated, data sectors 404 include synchronization fields ("synch fields") 406 and data fields 408. Synch fields 406 include synchronization information for timing recovery.

To enhance timing recovery, a synch field can contain known signal patterns (i.e., a preamble field or pilot sequence) and can by utilized to recover phase and frequency offset information. To illustrate an exemplary synchronization field, a preamble field can be written therein and can comprise sampling information (i.e., timing information). The sampling information can be used to produce sampling instances based on a sampling clock. A preamble field can consist of a number of bits in a predetermined pattern. In one example, the bits can be of the form [1 1 −1 −1 1 1 −1 −1] with a length of up to 160 bits. Sampling the preamble field provides information enabling the determination of timing errors such as frequency and phase offsets between the sampling instances and the desired sampling instances. In this manner, timing errors can be recovered and corrected. Synch fields 406 can include preamble fields having a known format similar to those mentioned above. In accordance with yet another embodiment synch fields 406 can form permanent synch sectors similar to servo sectors 402. In this manner, the synch sectors can operate similar to read-only memory (ROM).

Figure 5A:
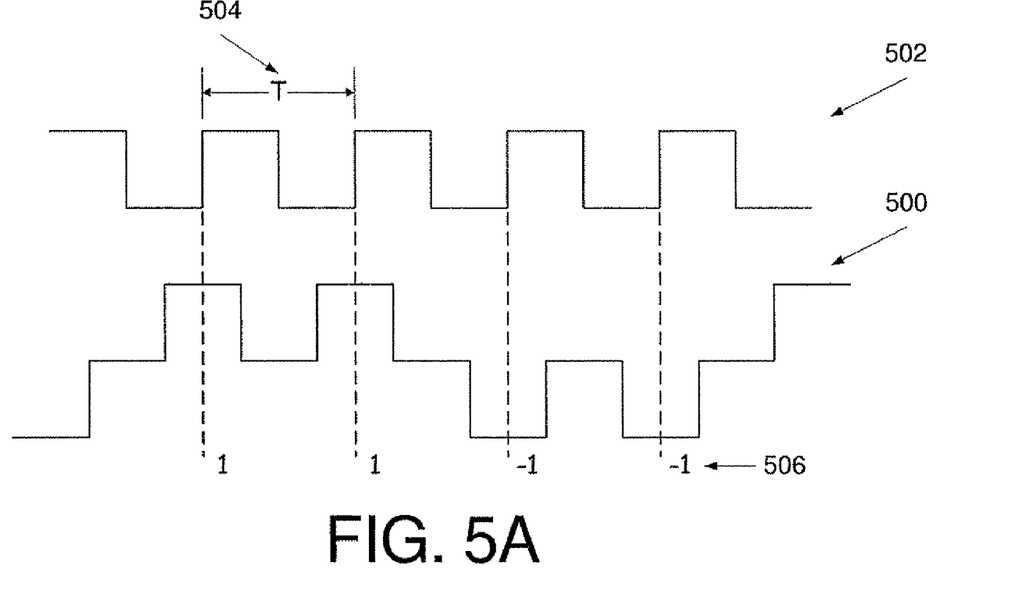
FIGS. 5A-5D are graphs illustrating methods of acquiring sampling instances in the context of a synchronization signal.
Figure 5B:
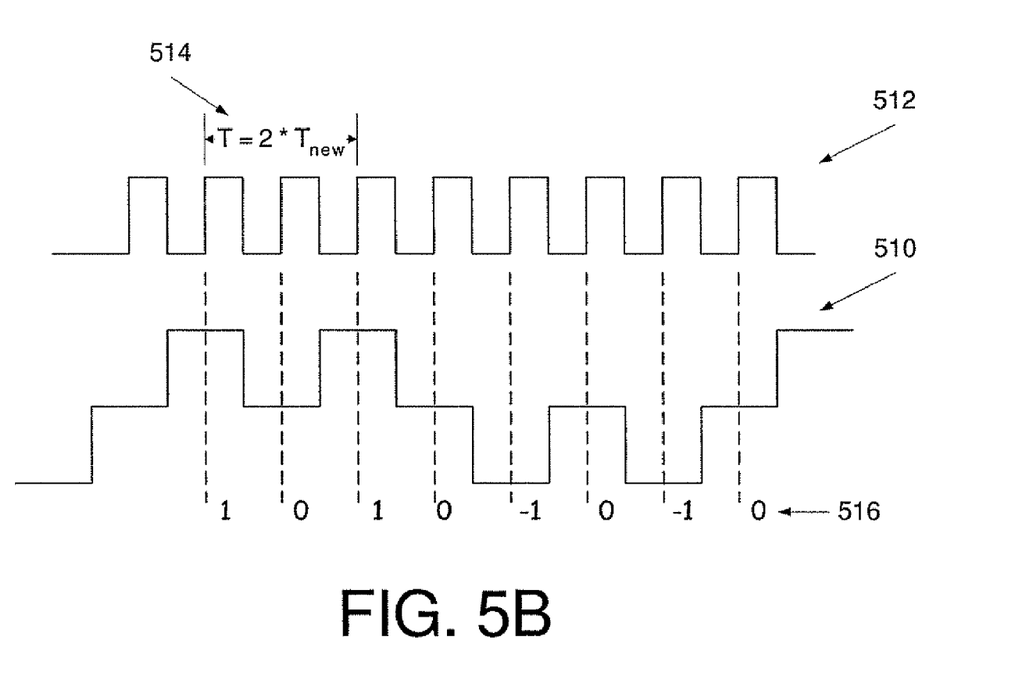

In accordance with another embodiment, a sampling clock associated with the synch field is used to enhance timing recovery. The sampling clock can be different from the clock that is used to process data within data sectors 404. FIG. 5A illustrates a preamble field 500 written on a patterned medium that can be utilized in a synch field for timing recovery purposes. In other embodiments, a preamble field can be utilized with conventional mediums, such as mediums employing random non-patterned grains. Preamble field 500 is sampled using a sampling clock 502 having a period 504. As is illustrated, sampling instances at the rising edge of clock 502 correspond to magnetization levels that provide samples 506. The magnetization levels can be used to calculate a location of a signal. FIG. 5B illustrates obtaining increased sampling information utilizing a preamble field 510 substantially similar to pattern 500. Preamble field 510 is sampled using a sampling clock 512 having an increased frequency (i.e., a reduced period 514). In the illustrated embodiment sampling clock 512 has a frequency twice the frequency of clock 502. In this manner, an increased number of samples 516 can be obtained from signals in preamble field 510. Thus, instances are taken from the signals as well as between the signals. In the case of a patterned medium, instances between the preamble signals yield a sample of '0', which can be used in timing recovery. Samples 516 can be taken to provide more information in order to recover sampling information such as phase and frequency offsets.

Figure 5C:
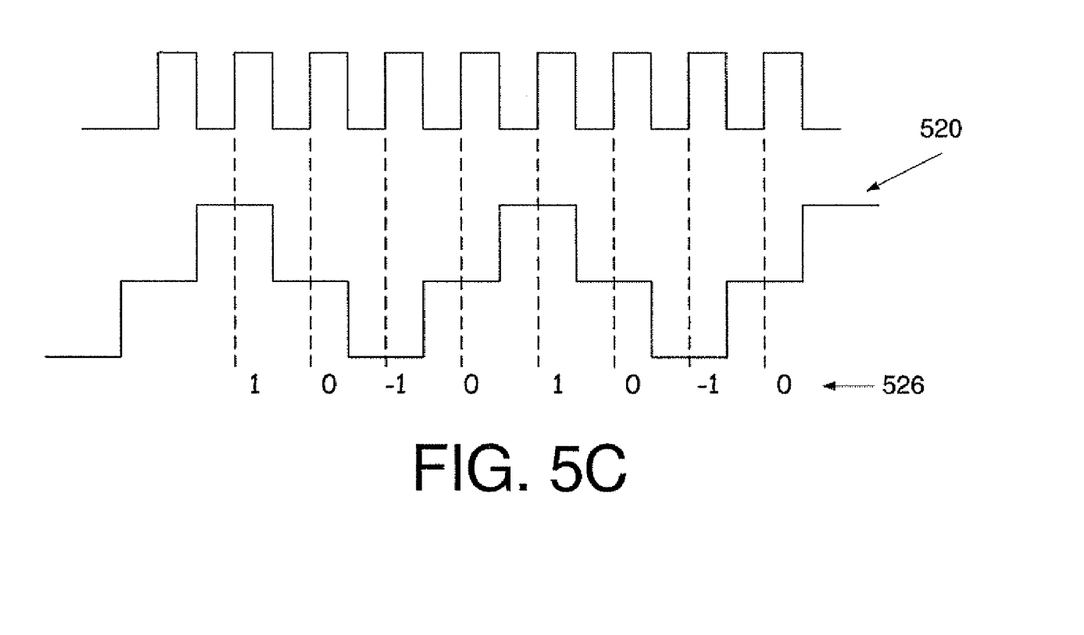
Figure 5D:
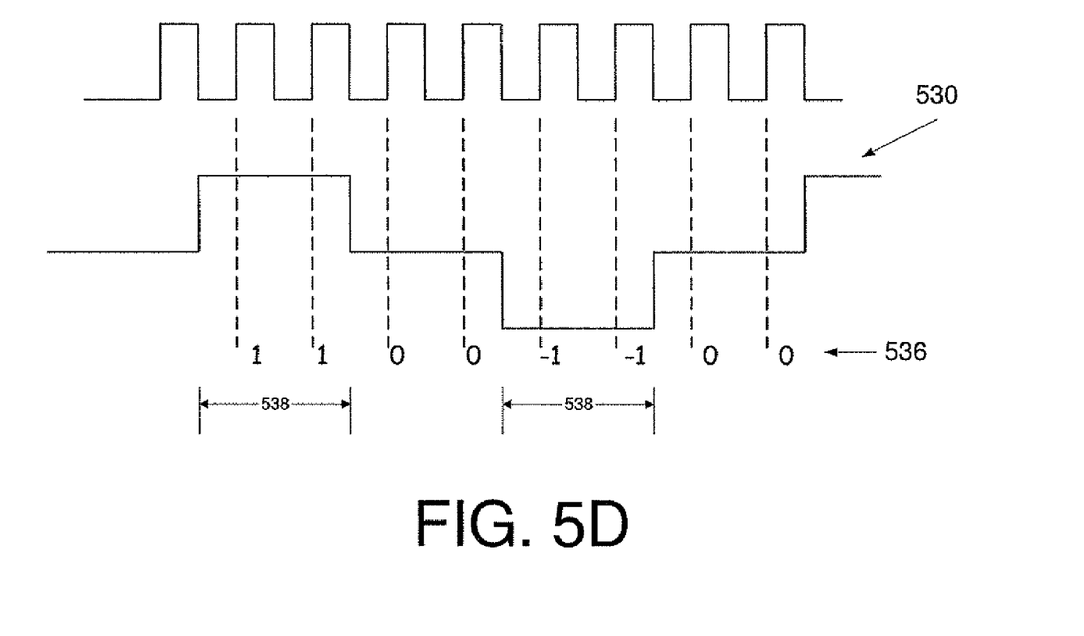

In accordance with other embodiments, FIGS. 5C and 5D illustrate alternative modifications to a preamble field to enhance timing recovery. In FIG. 5C, preamble field 520 comprises alternating between positive and negative magnetization levels. For a patterned medium, this sequence yields samples of (1, 0, −1, 0, 1, 0, etc.), which provides an enhanced signal-to-noise ratio. In FIG. 5D, preamble field 530 includes bit island 538 of increased size. The increased size can be larger than bit island for a data sector, which leads to increased performance when processing the preamble field. As a result of an increased signal-to-noise ratio and reduced interference, samples 526 and 536, obtained at the rising edges of the sampling clocks, can provide enhanced timing recovery.

Figure 6:
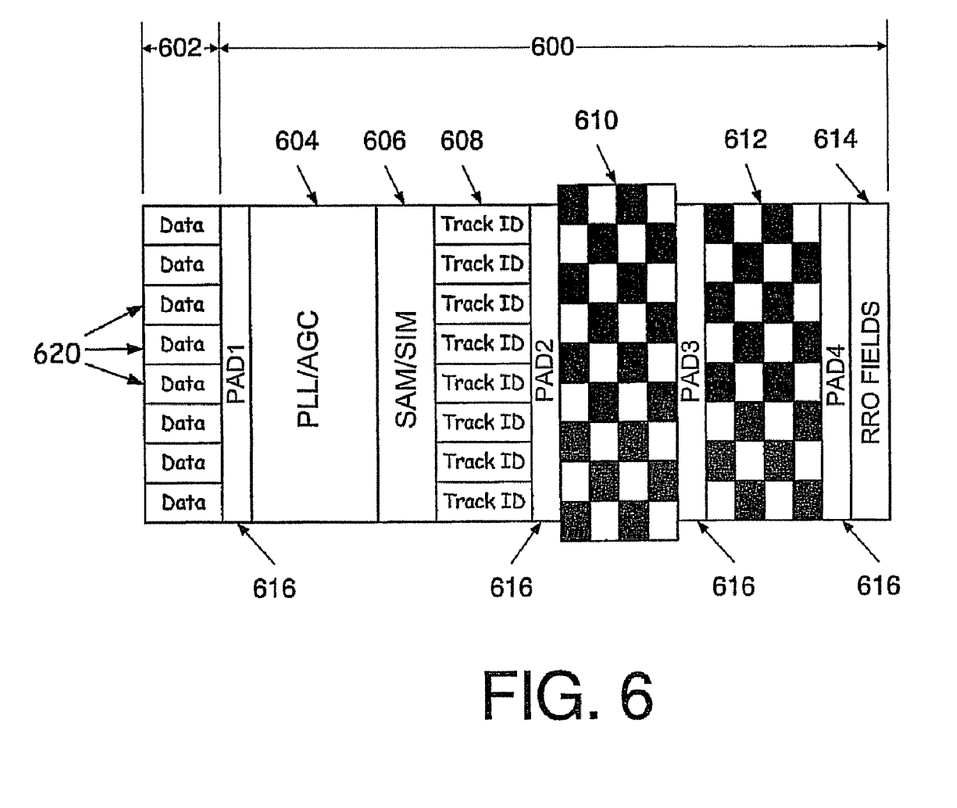
FIG. 6 illustrates the layout of an exemplary servo sector.

Servo sectors 402 can contain synchronization fields to enhance timing recovery. FIG. 6 is an illustrative view showing a format of an exemplary servo sector 600. Servo sector 600 is positioned adjacent to data sector 602 and contains information for timing recovery and synchronization. Data sector 602 includes a plurality of data tracks 620. In accordance with one embodiment servo sector 600 and data sector 602 are substantially similar to servo sector 402 and data sector 404 illustrated in FIG. 4.

Servo sector 600 includes a synch field 604 including a phase-lock loop (PLL) and/or an adaptive gain control (AGC) field utilized to perform timing recovery and adjust the gain of the analog signal. In one example, data stored in the PLL/AGC field is the same along a direction of the plurality of data tracks. Adaptive gain control (AGC) operates to scale the signal to a desired power level to prevent distortion, and to limit the signal to a power level that can be handled by a signal processor. The phase-lock loop (PLL) field contains synchronization information that is utilized to adjust the sampling instances used to process the servo sector. Synch field 604 can include a preamble field and associated sampling clock substantially similar to those describe with respect to FIGS. 5A-5D. Data bits in the preamble field can occur at a different phase and frequency than the data sectors, for example can have an increased size with respect to bits in the data sectors. Additionally, the associated sampling clock used to process the preamble field can be different (e.g., independent) than the clock utilized to process the data sectors. Further, the preamble field can include various structures that can be utilized to recover sampling information. In one example, the sampling information can be used to determine timing errors such as phase and frequency offset information.

Servo sector 600 also can comprise servo address mark (SAM) and/or a servo index mark (SIM) fields for storing information pertaining to the servo sector. Further, track ID's 608 provide positional information and correspond to one of a plurality of data tracks (e.g., one of tracks 620) in data sector 602. Additionally, a number of burst fields can also be provided to enable the read/write head to locate a center of the desired track. Illustratively, two burst fields 610 and 612 are shown, but it is important to note that any number of burst fields can be utilized.

Additionally, a repeatable runout (RRO) field 614 can also be written in servo sector 600 to compensate for RRO error. RRO error occurs in many cases where there exists a non-zero bias in the system. For example, in the case of circular media such as optical and magnetic discs, the tracks may not be perfect circles. In such a case, the RRO field can compensate for the predictable movement of the track relative to the head during each revolution.

Spaces 616 can also be provided throughout sector 600 to separate the above-described fields. It is important to note that the exemplary servo sector described in relation to FIG. 6 is simply an example of one possible format. Other servo sector layouts are within the scope of the present invention.

Figure 7:
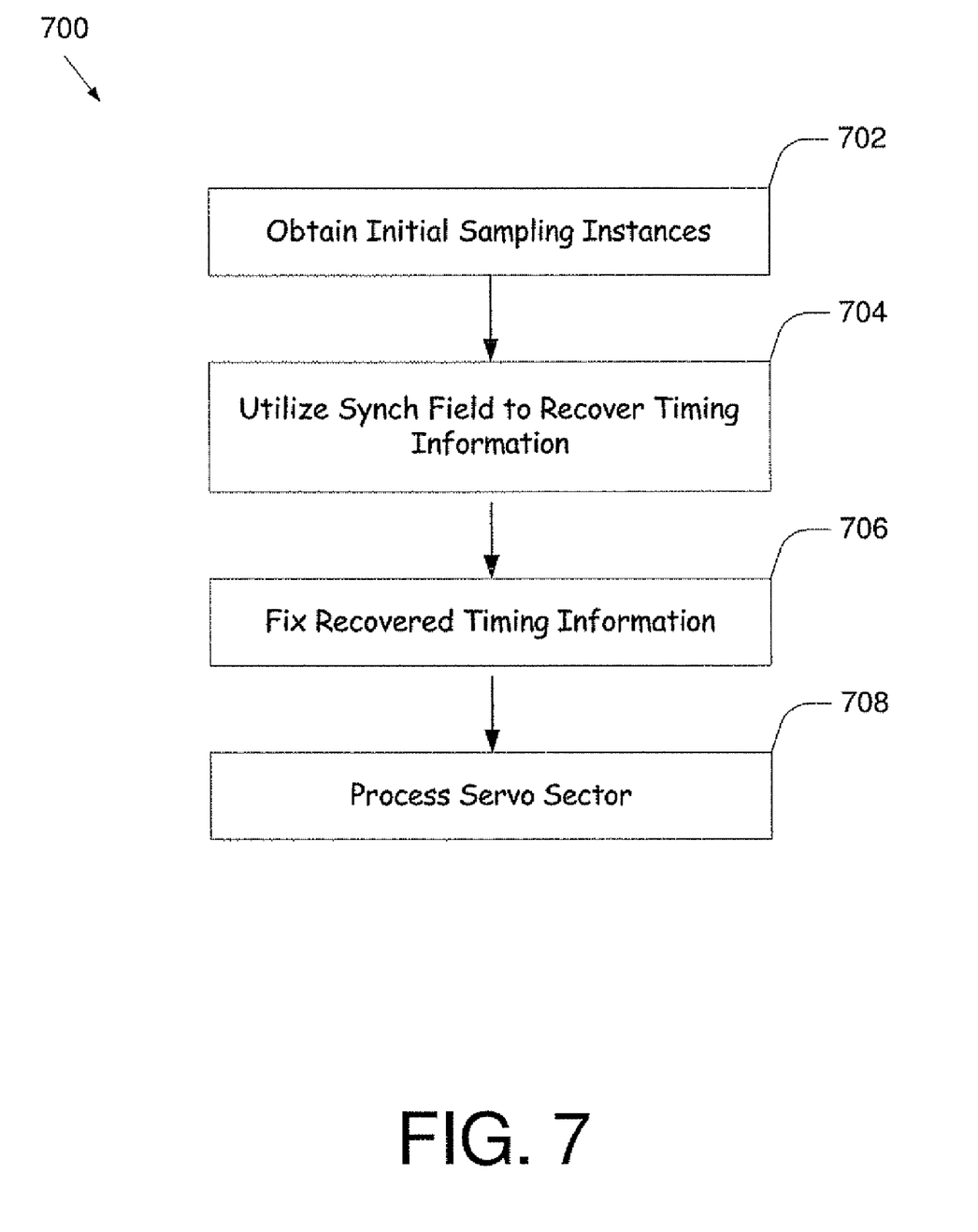
FIG. 7 is a flow chart illustrating timing recovery in the context of a servo sector.

FIG. 7 is a flow diagram illustrating a method 700 of timing recovery for servo synchronization. Method 700 can be utilized in conjunction with a servo sector such as the exemplary servo sector described in relation to FIG. 6. As mentioned above, a synch field can be any means for providing timing recovery information. In one embodiment, a synch field is utilized to recover phase and/or frequency offset information and can be a phase-lock loop (PLL) field. It is important to note that embodiments of the present invention described in the context of PLL fields are made solely for illustration. Any type of synchronization means can be utilized.

At step 702, initial sampling instances are obtained. The sampling instances can be based on, for example, a sampling clock and associated phase information. The sampling instances can be different from instances that are used to read data from or write data to a storage medium. The sampling instances can be chosen to provide adequate sampling data for timing recovery. At step 704, a synch field is utilized to recover timing information. In one example, timing errors such as phase and frequency offsets are recovered. The preamble field contained in the synch field can be adjusted in accordance with embodiments disclosed with relation to FIGS. 5A-5D to improve the signal-to-noise ratio, thus improving the acquired timing information. For example, instances can be taken from signals in the preamble field as well as between signals. Magnetization levels of the bit islands can further be utilized to determine the signals of the bit islands and acquire frequency and/or phase offset information.

A timing recovery loop can be implemented to process a synch field. In one example, the PLL circuit described with relation to timing recovery module 208 in FIG. 2 is utilized to process the synch field. A timing recovery loop can be implemented in association with any synchronization field described herein. In general, timing recovery loop parameters are set within the timing recovery loop depending upon design requirements. For example, a loop bandwidth describes the response time of the timing recovery loop. Further, a damping factor can be associated with system stability.

After timing information has been acquired from the synch field, the recovered timing information can be fixed at step 706. In one embodiment, the timing information includes phase and frequency information. The acquired information can be utilized to set the timing instances to process a remaining portion of the servo sector. Further, track ID fields contained in the servo sector can be utilized to recover timing information. At step 708, the servo sector is processed. The adjusted timing instances are used to process a remaining portion of the servo sector.

Figure 8:
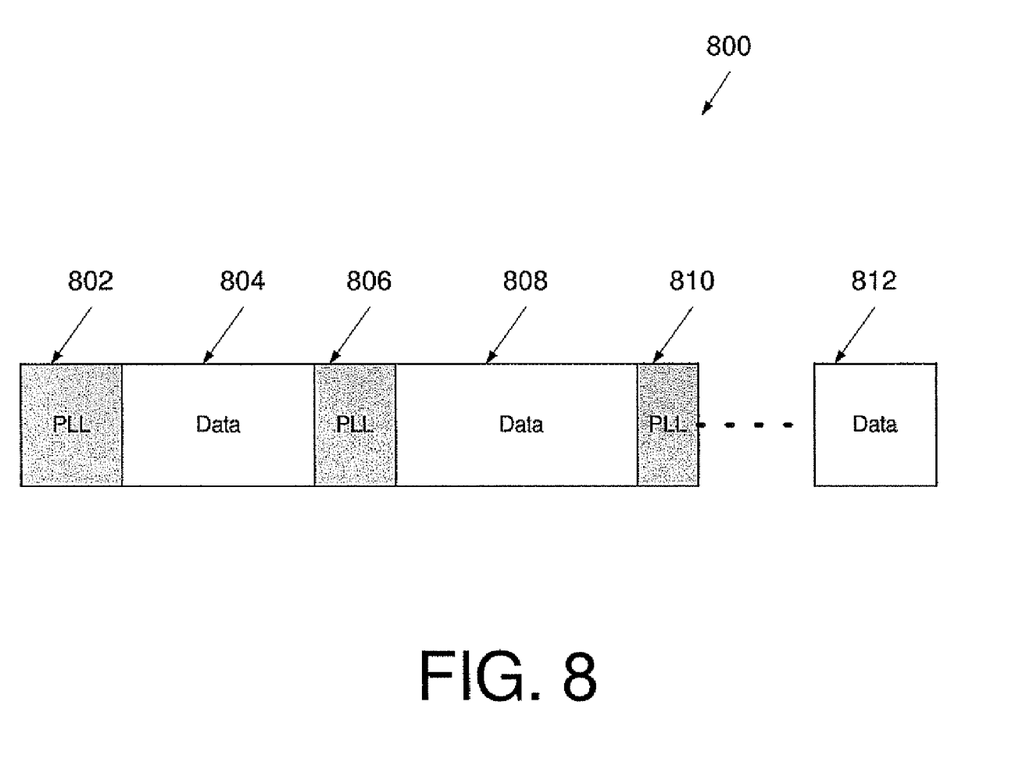
FIG. 8 illustrates the layout of an exemplary data sector.

To illustrate timing recovery in the context of data sectors, FIG. 8 shows an exemplary data sector 800. Data sector 800 can be implemented as data sector 404 described in the context of FIG. 4. Data sector 800 comprises a number of data fields 804, 808, 812, etc., and a number of synch fields 802, 806, 810, etc. The illustrated data fields contain user data while the synch fields contain a special sequence to recover timing information.

Figure 9:
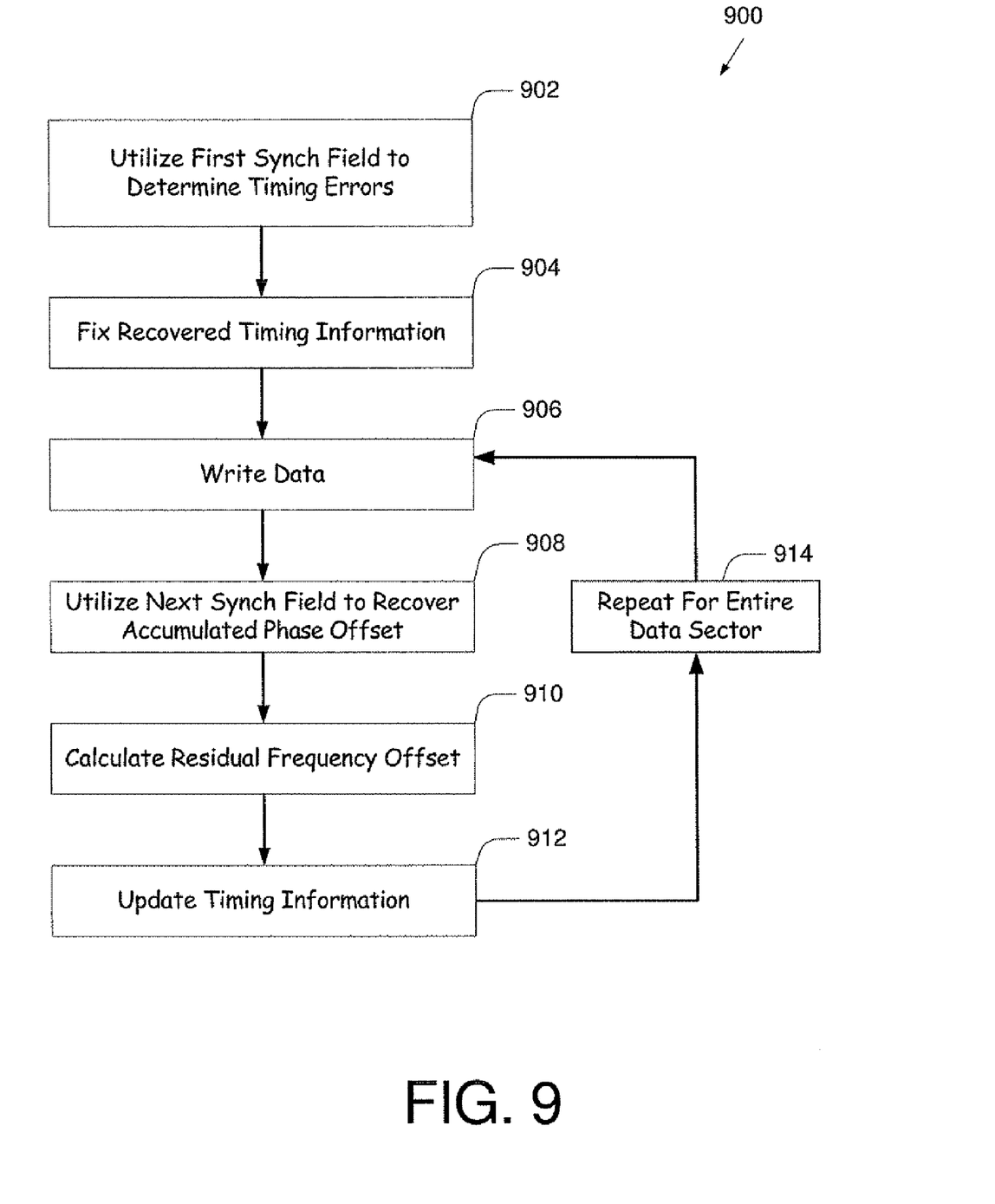
FIG. 9 is a flow chart of a method utilizing write synchronization.

FIG. 9 is a flow diagram illustrating a method 900 of timing recovery for write synchronization in data sector 800 of FIG. 8. At step 902, a first synch field in the data sector (i.e., synch field 802) is utilized to determine timing errors. In one embodiment, synch field 802 is substantially similar to PLL field 604 disclosed with relation to FIG. 6 and is accessed utilizing sampling instances. Additionally, the magnetization levels of the bit islands can be used to acquire frequency and/or phase offset information. Furthermore, a preamble field contained in the synch field can be adjusted in accordance with embodiments disclosed with relation to FIGS. 5A-5D to improve the signal-to-noise ratio, thus improving the acquired timing information.

After timing recovery information has been acquired from the first synch field, the recovered timing information can be fixed at step 904. The acquired timing recovery information can be utilized to adjust sampling instances. Next, at step 906, the fixed timing information is used to write data to at least one of the data fields contained in the data sector. To illustrate, with reference to FIG. 8, a data field 804 is written using timing information recovered from synch field 802.

After the data is written, at step 908, a next synch field (i.e., synch field 806) is utilized to recover an accumulated phase offset present in the signal acquired from the synch field. As discussed above, a preamble field can be utilized to determine the amount of phase offset. A timing recovery loop can be implemented to process synch field 806. The timing recovery loop can be substantially similar to the PLL circuit described above with relation to timing recovery module 208 in FIG. 2. Furthermore, the timing recovery loop can include a register pertaining to a residual frequency offset. Timing recovery loop parameters are set before synch field 806 is processed. In one example, the parameters are set to adequately recover any timing offset and can be based on system requirements such as response time, stability, etc.

At step 910, a residual frequency offset is calculated. The residual frequency offset is an offset of the frequency that has built up due to variations in operation of a system. In one embodiment, it is assumed that the dominant noise source for the phase accumulation is the residual frequency offset. In another embodiment, a register associated with the residual frequency offset is updated. The phase and frequency offset information can then be used to update timing information at step 912.

If data fields in the data sector remain to be written, the process is repeated (step 914). For example, with reference to FIG. 8, a data field 808 is written utilizing the synchronization information contained in synch field 806. Generally speaking, a given data field is written utilizing a preceding synch field.

Figure 10:
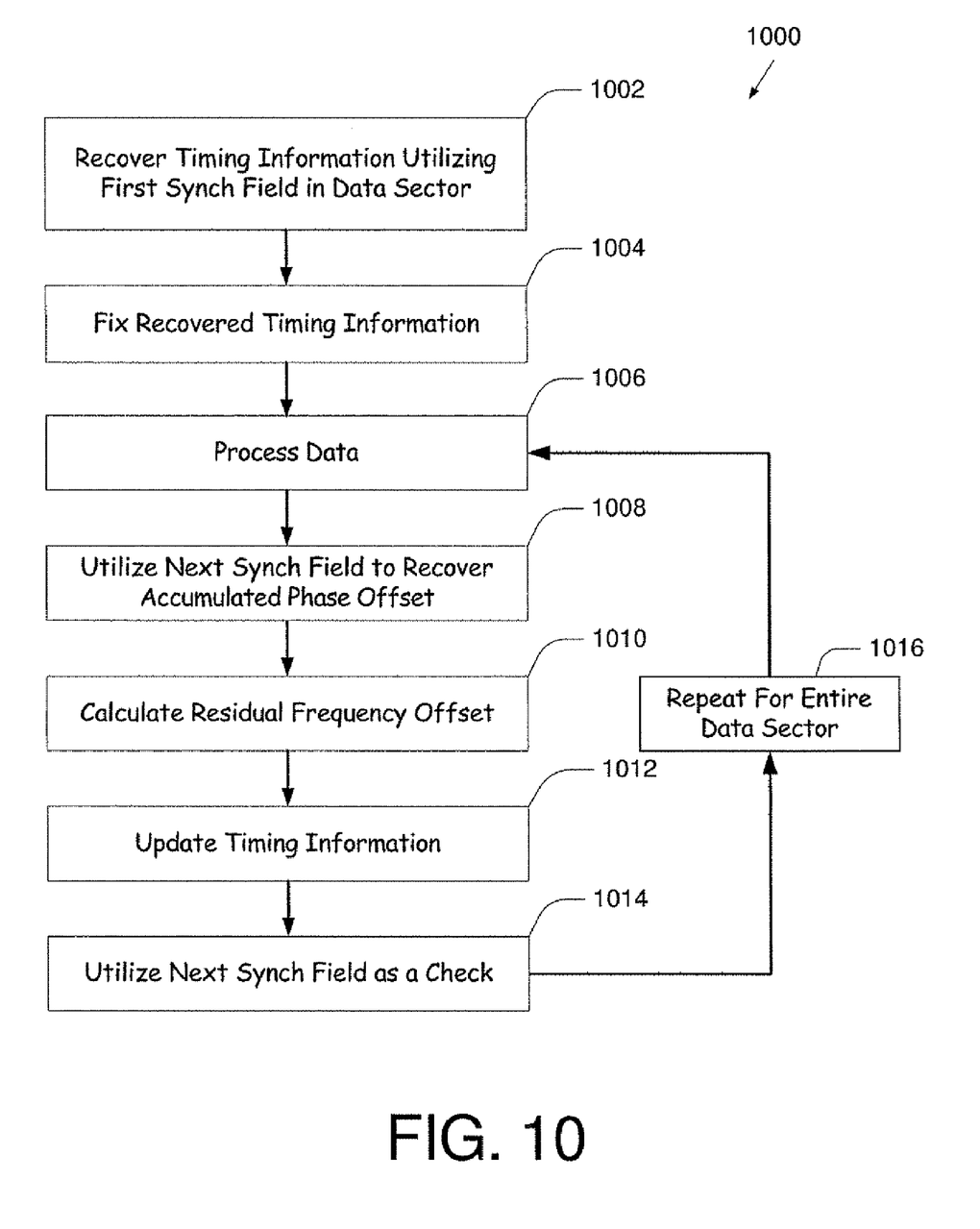
FIG. 10 is a flow chart of a method utilizing read synchronization.

Synch fields in data sector 800 can further be used in read synchronization. FIG. 10 is a flow diagram illustrating a method of read synchronization. First, during an acquisition phase, timing information is recovered using a first synch field (i.e., synch field 802) in a data sector (step 1002). A set of initial timing parameters can be utilized to sample a preamble field contained in the first synch field. A sampling clock frequency associated with the initial timing instances is adjusted to enhance recovery of the timing information contained in the first synch field. In yet another embodiment, the magnetization levels of the bit islands are determined to improve phase and frequency offset calculations.

At step 1004, the recovered timing information can be fixed. In one embodiment, at least one sampling parameter (e.g., sampling clock parameters) is determined based on the recovered timing information. In one example, a sampling clock frequency is set based on the recovered timing information. In another example, a sampling clock phase is adjusted. At step 1006, data is processed using the fixed timing information. With reference to the exemplary data sector in FIG. 8, data can be read from data field 804 using timing instances based on the fixed timing information acquired from synch field 802.

After the data field has been read, a tracking phase is implemented wherein a next synch field (e.g., synch field 806) is utilized to recover timing information. In one embodiment a timing recovery loop is implemented to process the next synch field 806. In one example, the timing recovery loop is substantially similar to the PLL circuit described above with relation to timing recovery module 208 in FIG. 2. In another embodiment, the timing recovery loop includes a register pertaining to a residual frequency offset. Timing recovery loop parameters are set before the next synch field 806 is processed. In one example, the timing recovery loop parameters are set such that the timing recovery loop can recover a worst case accumulated phase offset using the extra synch fields (i.e., synch fields 806, 810, etc.) contained in data sector 800.

At step 1008, an accumulated phase offset is determined and at step 1010 a residual frequency offset is calculated. Phase offset accumulation can be determined using a register value used to update the timing phases. Further, in one example, it can be assumed that the dominant noise source for the phase accumulation is the residual frequency offset. A register associated with the frequency offset in the system can also be updated. Next, using the information contained in the synch field, the timing information is updated (step 1012). For example, a sampling dock frequency can be updated based on the information acquired from the synch field.

The synch fields can be utilized as a check (step 1014) to determine the veracity (or accuracy) of the data read from the data fields. For example, again with reference to the exemplary data sector in FIG. 8, a synch field 806 can be utilized to verify whether the preceding data (i.e., data field 804) has been read correctly based on recovered timing information. In one embodiment, if the residual frequency offset is larger than a predefined threshold, the residual frequency offset and the accumulated phase offset are corrected and the written data is determined to be unreliable.

If data sectors remain to be read, the process is repeated (step 1016). For example, again with reference to FIG. 8, data sector 808 is read utilizing the synchronization information contained in the previous synch field (ie., synch field 806). The subsequent synch field 810 can then be utilized as a check to determine whether the data read from data field 808 is reliable.

It is to be understood that even though numerous characteristics and advantages of various embodiments of the invention have been set forth in the foregoing description, together with details of the structure and function of various embodiments of the invention, this disclosure is illustrative only, and changes can be made in detail, especially in matters of structure and arrangement of parts within the principles of the present invention to the full extent indicated by the broad general meaning of the terms in which the appended claims are expressed.

In addition, although the preferred embodiment described herein is directed to a method for synchronization in media storage systems, it will be appreciated by those skilled in the art that the teachings of the present invention can be applied to other communication systems, without departing from the scope and spirit of the present invention.

What is claimed is:

1. A method of processing data in a communication system, the method comprising:
   accessing a first sequence of signals, stored on a patterned media having a first plurality of bit islands, from a channel associated with the communication system;
   obtaining samples from the first sequence of signals and samples between the first sequence of signals;
   calculating a first phase offset and a frequency offset using the samples from the first sequence of signals and the samples between the first sequence of signals; and
   processing a second sequence of signals based on the first phase offset and the frequency offset, wherein the first plurality of bit islands have a first size and wherein the second sequence of signals is stored on a second plurality of bit islands having a second size that is different from the first size.

2. The method of claim 1 further comprising determining a magnetization level of the first sequence of signals and calculating the phase offset and the frequency offset based on the magnetization levels.

3. The method of claim 1 further comprising calculating a location of the samples from the first sequence of signals and a location of the samples between the first sequence of signals and calculating the first phase offset and frequency offset based on the locations.

4. The method of claim 1 further comprising writing data to a storage medium based on the first phase offset and the frequency offset.

5. The method of claim 1 further comprising reading data from a storage medium based on the first phase offset and the frequency offset.

6. The method of claim 1 further comprising:
   processing a third sequence of signals; and
   calculating a second phase offset and a second frequency offset based on the third sequence of signals, the first phase offset and the first frequency offset.

7. The method of claim 6 further comprising processing a fourth sequence of signals from the channel based on the first phase offset, the first frequency offset, the second phase offset and the second frequency offset.

8. A method of processing data in a communication system, the method comprising:
   accessing a first sequence of signals from a channel associated with the communication system;
   obtaining samples from the first sequence of signals and samples between the first sequence of signals;
   calculating a first phase offset and a frequency offset using the samples from the first sequence of signals and the samples between the first sequence of signals;
   processing a second sequence of signals from the channel based on the first phase offset and the frequency offset;
   processing a third sequence of signals;
   calculating a second phase offset and a second frequency offset based on the third sequence of signals, the first phase offset and the first frequency offset; and
   checking errors in the second sequence of signals based on the second phase offset and the second frequency offset.

9. The method of claim 1 wherein the sequence of signals includes a phase-lock loop (PLL) field.

10. A method of processing data from a data storage medium, comprising:
    forming the data storage medium as a patterned medium including a plurality of bit islands;
    accessing a data sector having a plurality of timing recovery portions and a plurality of data portions;
    processing a first timing recovery portion of the data sector to calculate a first phase offset and a first frequency offset;
    processing a first data portion based on the first phase offset and the first frequency offset;
    processing a second timing recovery field to calculate a second phase offset and a second frequency offset based on the first phase offset and the first frequency offset;
    processing a second data portion based on the first phase offset, the first frequency offset, the second phase offset and the second frequency offset; and
    wherein the timing recovery portions include bit islands having a first size and the data portions include bit islands having a second size that is different from the first size.

11. The method of claim 10 wherein the first timing recovery portion and the second timing recovery portion include a sequence of signals and wherein processing the first timing recovery portion and the second timing recovery portion includes obtaining samples of the sequences of signals and samples between the sequence of signals.

12. The method of claim 10 wherein processing the first data portion and the second data portion includes writing data to the first data portion and the second data portion.

13. A method of processing data from a data storage medium, comprising:

accessing a data sector having a plurality of timing recovery portions and a plurality of data portions;

processing a first timing recovery portion of the data sector to calculate a first phase offset and a first frequency offset;

processing a first data portion based on the first phase offset and the first frequency offset;

processing a second timing recovery field to calculate a second phase offset and a second frequency offset based on the first phase offset and the first frequency offset;

processing a second data portion based on the first phase offset, the first frequency offset, the second phase offset and the second frequency offset; and determining a residual frequency offset based on the first frequency offset and the second frequency offset.

14. A data storage system, comprising:

a storage medium;

a plurality of servo sectors on the storage medium, each servo sector including a timing recovery portion;

a plurality of data sectors on the storage medium, each data sector including alternating timing recovery and data portions; and a channel configured to write data to and read data from the storage medium, wherein the channel is further configured to process the timing recovery portions to calculate a phase offset and first and second frequency offsets and process the data portions based on the phase offset and the first frequency offset; and wherein the storage medium is a patterned medium having a plurality of bit islands.

15. The data storage system of claim 14 wherein the timing recovery portions including bit islands of a larger size than the data portions.

\* \* \* \* \*

UNITED STATES PATENT AND TRADEMARK OFFICE
CERTIFICATE OF CORRECTION

PATENT NO. : 7,643,235 B2
APPLICATION NO. : 11/536310
DATED : January 5, 2010
INVENTOR(S) : Erden et al.

It is certified that error appears in the above-identified patent and that said Letters Patent is hereby corrected as shown below:

On the Title Page:

The first or sole Notice should read --

Subject to any disclaimer, the term of this patent is extended or adjusted under 35 U.S.C. 154(b) by 611 days.

Signed and Sealed this

Sixteenth Day of November, 2010

David J. Kappos
*Director of the United States Patent and Trademark Office*